No. 687,707. Patented Nov. 26, 1901.
H. A. WEBSTER.
ROTARY EDGE SETTER.
(Application filed Jan. 12, 1900.)
(No Model.) 2 Sheets—Sheet 2.
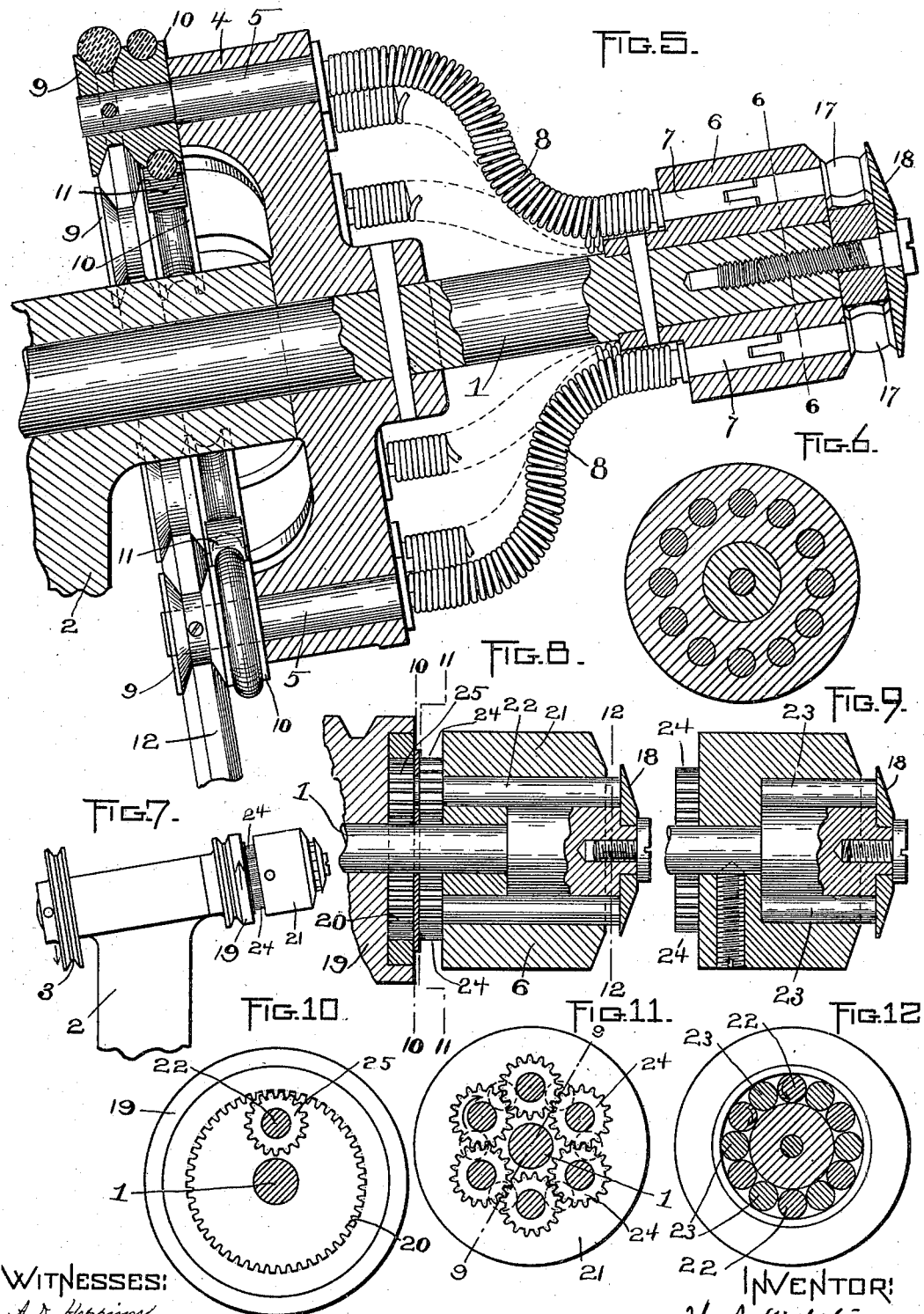
WITNESSES: INVENTOR:

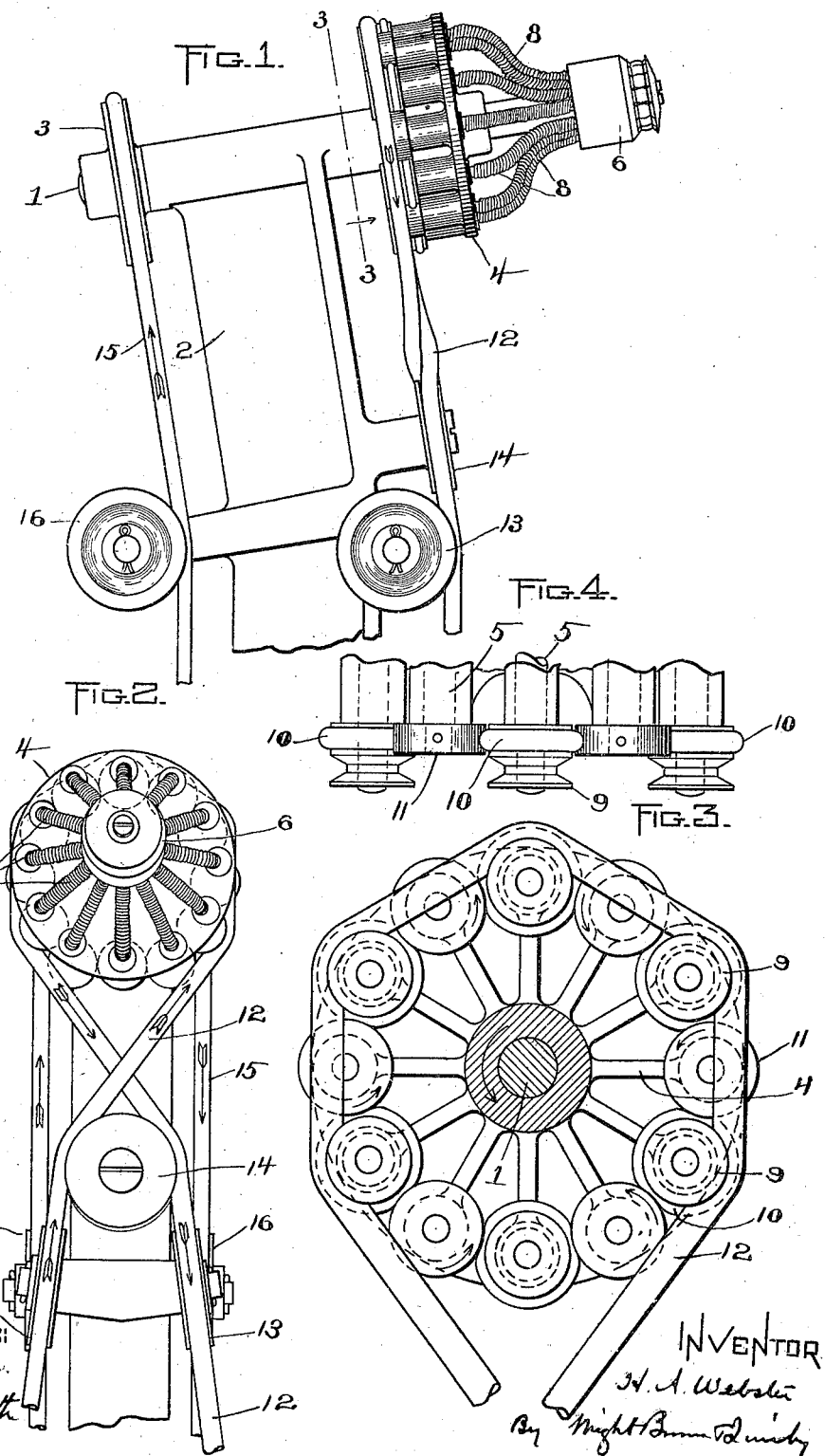

UNITED STATES PATENT OFFICE.

HAROLD A. WEBSTER, OF HAVERHILL, MASSACHUSETTS, ASSIGNOR TO HERBERT B. NEWTON, OF HAVERHILL, MASSACHUSETTS.

ROTARY EDGE-SETTER.

SPECIFICATION forming part of Letters Patent No. 687,707, dated November 26, 1901.

Application filed January 12, 1900. Serial No. 1,231. (No model.)

*To all whom it may concern:*

Be it known that I, HAROLD A. WEBSTER, of Haverhill, in the county of Essex and State of Massachusetts, have invented certain new and useful Improvements in Rotary Edge-Setters, of which the following is a specification.

This invention relates to machines for setting and burnishing the sole edges of boots and shoes. Superior results are attained by performing this operation with a reciprocating tool to which a rapid movement is imparted in a machine; but the rack of a reciprocating tool and its actuating mechanism are detrimental to the machine, and the vibration is objectionable to the operator.

My invention has for its object to obtain an action analogous to that of the reciprocating tool in a rotary edge-setter.

The invention consists in the improvements which I shall now proceed to describe and claim.

Of the accompanying drawings, Figure 1 represents a side elevation of a rotary edge-setter constructed in accordance with my invention. Fig. 2 represents a front elevation thereof. Fig. 3 represents a section on line 3 3 of Fig. 1 on an enlarged scale. Fig. 4 represents an enlarged detail plan view showing the driving ends of the setting-rolls. Fig. 5 represents a longitudinal sectional view, enlarged, of the head. Fig. 6 represents a section on line 6 6 of Fig. 5. Fig. 7 represents a side elevation showing a modification. Fig. 8 represents an enlarged longitudinal section of the head in said modification, taken on a plane through the axes of the driven setting-rolls. Fig. 9 represents a similar section in a plane through the idle rolls. Figs. 10 to 12, inclusive, represent sections on the correspondingly-numbered lines of Fig. 8.

The same reference characters indicate the same parts in all the figures.

Referring at first to Figs. 1 to 6, 1 designates a shaft mounted in suitable bearings on a frame 2 and having keyed to it a pulley 3, a hub or spider 4, which journals a circular series of short shafts 5 5, mounted parallel to shaft 1, and a holder 6, journaling a second circular series of short shafts 7 7, arranged parallel to shaft 1 and equal in number to the shafts 5. The several shafts 5 are connected with the several shafts 7 by flexible couplings or shaft-sections 8 8, which may be composed of wire coiled in helical form, as shown. Each alternate shaft of the series 5 has secured to its rear end a grooved pulley 9 and a driving-roll 10, whose periphery is composed of a suitable material, such as soft rubber, of good tractive or holding power, and the shafts 5 between the shafts thus provided with pulleys have friction-rolls 11 11 affixed to their rear ends and engaged with the rubber-tired rolls 10. A belt 12, passing around a large drive-pulley (not shown) and over suitable guide-pulleys 13 14, is passed over the series of pulleys 9 and lodged in the grooves of said pulleys. Another belt 15, suitably driven, passes over guide-pulleys 16 and around the pulley 3. Said belts are driven, preferably, in opposite directions and at such speeds as to impart the desired rotative speed to the shaft 1 and to the several pulleys 9. The outer ends of the shafts 7 are formed or provided with rolls 17 17, which act upon the work—namely, the edge of the shoe-sole—which is held up to said rolls by the operator. By the described driving arrangements adjacent rolls are rotated in opposite directions. The shaft 1 preferably rotates at a relatively low speed—say several hundred revolutions per minute—and the rolls 17 at a relatively high speed—say several thousand revolutions per minute. It will be seen that each roll 17 has a planetary movement— that is, a movement of translation about the axis of the shaft as a center—and a movement about its own center. The result is that a series of oppositely-moving surfaces are brought into contact in rapid alternation with each part of the sole edge as the latter is moved along or fed. The action is similar in effect to that of a reciprocating tool, but without the accompanying racking and noise of the machine and the objectionable vibration felt by the operator.

In Figs. 7 to 12 I show a modification. 1 is a shaft journaled as before and having fixed to it a pulley 3 and a head or holder 21, which journals a circular series of short shafts 22. The outer ends of said shafts 22 constitute the edge-setting rolls, and their rear ends are provided with gears 24 24, meshing in a circular series. One of the shafts is provided with an additional gear 25, which meshes with an internal gear 20, fixed to a pulley 19, which revolves loosely on the shaft 1. Relative rotary movement imparted to the pulley 19 and the holder 21 will cause the series of shafts 22 to rotate in their bearings, each shaft rotating in an opposite direction to the ones with which it is in gear on either side. The pulleys 3 and 19 are rotated in opposite directions by belts, and the result is a planetary movement of each setting-roll similar to that described in the former embodiment. Between the driven shafts or rolls 22 are located idle rolls 23 23, which rotate loosely and serve to make a bearing for the work.

At the end of the holder 6 beyond the setting-rolls in both forms of the edge setter shown in the drawings is an end plate or guard 18, designed to overlie the welt or the upper edge of the sole.

The edge-setting rolls 17 or 22 may have any suitable shape, in conformity with the character of the work. In Fig. 5 the middle body of the roll is convexed or beaded to conform to a concave sole edge, while in Fig. 8 the roll is cylindrical to conform to a flat sole edge.

While I have shown in the present application the rolls as adapted to have an independent movement of rotation about their own axes, I do not wish to be understood as limiting myself to such a construction. I believe myself to be the first to construct an edge-setter comprising a holder equipped with a series of setting members or rolls that are spaced from each other and from the holder, whether or not said rolls rotate about their axes or are fixed and have no movement except that imparted by the holder, and I desire to claim my invention in the broadest possible manner. The spacing of the rolls from each other and from the holder will become evident by an inspection of the drawings. (See Fig. 5, wherein the rolls 17 appear spaced from one another and also from the part of the holder standing in the same plane as the rolls and upon which the plate or guard 18 rests.) While the rolls may bear upon the holder at their ends, yet they are separated in a lateral sense not only from each other, but from the holder. The extension of the holder upon which the plate or guard 18 rests is merely for an abutment against which the plate or guard may be forced and held by the screw, as shown.

Having thus explained the nature of my invention and described a way of constructing and using the same, although without having attempted to set forth all the forms in which it may be embodied or all the modes of its use, I declare that what I claim is—

1. An edge-setter comprising a series of setting-rolls, and means for imparting planetary movements thereto.

2. An edge-setter comprising an endless series of setting-rolls, means for imparting a continuous movement of translation to said rolls, and means for rotating the individual rolls of said series about their own axes.

3. An edge-setter comprising an endless series of setting-rolls, means for imparting a continuous movement of translation to said rolls, and means for rotating adjacent rolls of said series about their own axes in opposite directions.

4. A rotary edge-setter comprising a circular series of setting-rolls, means for revolving said rolls about a common center, and means for rotating adjacent rolls of said series about their own axes in opposite directions.

5. A rotary edge-setter comprising a holder journaled for rotary movement about an axis, a circular series of rolls journaled in said holder, and driving connections between said rolls, arranged to cause adjacent rolls to rotate in opposite directions.

6. A rotary edge-setter comprising a suitably-journaled shaft having a holder, provisions for rotating the shaft, a circular series of shafts journaled in said holder and provided with setting-rolls, a second holder on said shaft, a second circular series of shafts journaled in said second holder, the second circle being of larger diameter than the first circle, flexible shaft-sections connecting the shafts of the second series with the shafts of the first series, and provisions for simultaneously rotating alternate shafts of the second series in opposite directions.

7. A rotary edge-setter comprising a circular series of setting-rolls, a circular series of shafts connected therewith and each alternate shaft provided with a pulley and with a friction-roll, friction-rolls on the intermediate shafts engaging the first said friction-rolls, a belt engaging the said pulleys, and means to rotate the series of rolls and shafts about a common center.

8. In a rotary edge-setter, a driving member, and means carried thereby for setting the edge of a sole, comprising a series of rolls that are laterally spaced from each other and from said member, said rolls being capable of movement independent of said driving member.

9. An edge-setting roll 17 having an axillary curved central portion terminating in end flanges that are inclined to the axis of said roll and to the curvature of said central portion.

10. An edge-setter comprising a driving member, and means carried thereby for setting the edge of the sole, comprising a series of separate rolls.

11. An edge-setter comprising a driving member, means carried thereby for setting the edge of the sole, comprising a series of separate rolls arranged to permit movement of said rolls independent of said member.

In testimony whereof I have affixed my signature in presence of two witnesses.

HAROLD A. WEBSTER.

Witnesses:
E. BATCHELDER,
C. F. BROWN.